US009737051B2

(12) United States Patent
Weber

(10) Patent No.: US 9,737,051 B2
(45) Date of Patent: Aug. 22, 2017

(54) DEVICE FOR SECURELY EXPOSING AN ANIMAL'S EAR CANALS

(71) Applicant: David Kenneth John Weber, Dana Point, CA (US)

(72) Inventor: David Kenneth John Weber, Dana Point, CA (US)

(*) Notice: Subject to any disclaimer, the term of this patent is extended or adjusted under 35 U.S.C. 154(b) by 247 days.

(21) Appl. No.: 14/739,326

(22) Filed: Jun. 15, 2015

(65) Prior Publication Data

US 2016/0360727 A1 Dec. 15, 2016

(51) Int. Cl.
A01K 13/00 (2006.01)

(52) U.S. Cl.
CPC .......... *A01K 13/006* (2013.01); *A01K 13/003* (2013.01)

(58) Field of Classification Search
CPC ... A01K 13/003; A01K 13/006; A01K 27/001
USPC ............... 119/814, 850, 856; 602/74
See application file for complete search history.

(56) References Cited

U.S. PATENT DOCUMENTS

| | | | | |
|---|---|---|---|---|
| 93,325 A * | 8/1869 | McIntosh | ................ | B68B 1/04 54/80.1 |
| 1,179,473 A * | 4/1916 | Taylor | ................ | A42B 1/066 2/172 |
| 1,758,764 A * | 5/1930 | Roxburg | ................ | A61F 13/122 602/74 |
| 3,823,713 A * | 7/1974 | Shah | ................ | A61F 13/12 2/174 |
| 5,163,272 A * | 11/1992 | Finley | ................ | A01K 13/006 54/80.1 |
| 6,502,532 B2 * | 1/2003 | Sjolin | ................ | A61D 9/00 119/174 |
| 6,553,945 B2 * | 4/2003 | Rice | ................ | A01K 13/006 119/821 |
| 7,743,736 B2 * | 6/2010 | Winestock | ................ | A01K 13/006 119/814 |
| 7,753,007 B1 * | 7/2010 | Anderson | ................ | A01K 15/028 119/721 |
| 7,946,254 B2 * | 5/2011 | Chao | ................ | A01K 13/00 119/814 |
| 7,946,256 B2 * | 5/2011 | Mann | ................ | A01K 13/006 119/850 |
| 8,402,926 B1 * | 3/2013 | Nunez | ................ | A01K 13/006 119/850 |
| 9,295,229 B2 * | 3/2016 | Mills | ................ | A01K 13/006 |
| 2008/0053381 A1 * | 3/2008 | Regina | ................ | A01K 13/006 119/850 |

(Continued)

*Primary Examiner* — Ruth Ilan
(74) *Attorney, Agent, or Firm* — Omni Legal Group; Omid E. Khalifeh

(57) ABSTRACT

A device is provided to aid prevention and treatment of ear infections in animals. In an embodiment, the device comprises a first strip and second strip of material such as elastomeric fabric. Each strip defines first and second holes corresponding to an animal's ears. Each ear may be received by one of the holes defined by the first strip. Then, the ears may be folded over the first strip to expose the animal's outer ear canal. Finally, the second strip may be placed over the folded ears and secured to the first strip to maintain the ears between the first and second strips. Thus, in practice, the device fixedly exposes the outer ear canals to air flow to prevent the growth of bacteria and yeast and further aids cleaning and medicinal applications.

8 Claims, 4 Drawing Sheets

(56) References Cited

U.S. PATENT DOCUMENTS

2009/0178628 A1\* 7/2009 Carmean .............. A01K 13/006
                                                                                       119/850

\* cited by examiner

DEVICE FOR SECURELY EXPOSING AN ANIMAL'S EAR CANALS

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material that is subject to copyright protection. This patent document may show and/or describe matter that is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to animal care and, more particularly, a device to for aiding prevention and treatment of outer ear conditions that are known to effect some animals.

BACKGROUND

Ear infections, particularly of the outer ear canal, commonly occur in dogs and other animals when bacteria and even yeast become trapped in the animals' ears. Indeed, some estimate that treatment and prevention of such a pervasive condition contributes to a $50 million-a-year industry.

Popular methods for addressing this problem occur in two phases. First bacteria and yeast inhabiting the ear canal must be eliminated by effectively cleaning the ear canal. Second, medications for preventing bacteria and yeast from growing must be applied. Even when appropriate medications are timely applied, infection is known to recur and even persist. This is due in large part to anatomy. Animals with long, heavy, and even particularly hairy ears that block airflow, in turn trapping heat and moisture within the air canal, are known to experience increased incidences of ear infections. With respect to dogs, breeds such as Cocker Spaniels, Bassett Hounds, Airedales, and Golden Retrievers exhibit such ear anatomy and, as a result, are known to similarly suffer from chronic ear conditions.

Solutions have been proposed to aid prevention and treatment of animal ear infections. For example, U.S. Pat. No. 8,402,926 to Nunez discloses a water resistant cap for protecting animals' ears from moisture during bathing. U.S. Pat. No. 7,946,256 to Mann discloses a restrictive cover formed as shells that cover the animals' ears. Although these prevent moisture and debris from initially entering the animals' ear canals, they fail to provide the airflow necessary to reduce humidity already existing therein. As another example, U.S. Pat. No. 7,946,254 to Chao discloses an apparatus formed as two connected elastic rings that lift the bases of an animal's floppy ears away from the animal's head. This solution is deficient, however, because by merely lifting the base of the ear, the device fails to fully expose the ear canal to airflow. Indeed, a portion of the floppy ear at least partially obscures the opening of the ear.

In light of these deficiencies, other practices have been implemented in an attempt to, at least temporarily, permit unimpeded airflow in and around the animal's ear and reduce the humidity that allows yeast and bacteria to thrive within the ear canal. Some animal owners and veterinarians, for instance, simply observe the affected animal and, when the animal falls asleep, flip its ear or ears to expose its ear canals to the open air. Many animals, however, are quick to wake up upon such contact, and shake their own ear back into its naturally flopped position. Others have attempted to more securely expose the animals' ear canals by clipping, pinning, or tying the ears back. These solutions, however, can be uncomfortable for the animal and even risk cutting off circulation to the pinned or tied portion of the animal's ears. Indeed, if pinned or tied tight enough or for a long enough period of time, the affected tissue may even experience necrosis and fall off of the ear.

Although various proposals have been made to solve the problem, none of those in existence combine the characteristics of the present invention. Therefore, there remains a need for a device that aids prevention and treatment of animal ear conditions by securely exposing their ear canals.

SUMMARY

The present disclosure is directed to a device for preventing and aiding treatment of ear infections and other conditions in animals. The disclosure is further directed to a device for aiding animal caregivers with applying medication to the animals' ears.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, the device comprises a first and second strip of material. Each strip may have a top and a bottom side, and further define a first and second hole corresponding to respectively to each of an animal's ears. The material may be any material able to conform to the shape of an animal's head. It is further contemplated that the material may even be elastomeric in order to enhance comfort and accommodate animal heads of various shapes and sizes. Thus flexible material such as neoprene, nylon, cotton, gauze, silk, linen, or even a combination of any of the same may be selected to comprise the first and second strips. Of course, it should be noted that such materials are offered by way of example only and not of limitation.

In use, each of the animal's ears may be received by one of the holes defined by the first strip. Then, each of the ears may be folded over the top side of the first strip toward the top of the animal's head. In this manner, the animal's ear canals may become exposed to the open air. In order to secure the device on the animal's head, the first strip may further comprise first and second ends that are releasably securable beneath the animal's chin. For example, the first and second ends may comprise releasably meshable hook and loop fasteners or even snaps to ensure the device remains securely placed on the animal's head while in use. In some embodiments, the first and second ends may even further be tapered in order to enhance comfort and avoid impeding the animal's cervical and mandibular ranges of motion.

When the animal's ears have been received through the holes defined by the first strip, and the first strip has been secured around the animal's head, the second strip may then be placed over the openly folded ears so that each of the first and second holes defined by the second strip may overlay on each of the ears' canals, allowing the ear canals to remain exposed to the open air while the device is in use.

In one embodiment, the first and second strips may be releasably securable to one another so that the ears may be selectively maintained in their openly folded position. For example, the top side of the first strip and bottom side of the second strip may comprise hook and loop fasteners to securably mesh with one another. As another example, the top side of the first strip and bottom side of the second strip may comprise snaps or zippers or other means for selectively securing the first and second strips to one another. In this manner, it is contemplated that an animal caregiver such as pet owner or even veterinarian may repeatedly secure and unsecure the first and second strips from one another. This may be particularly desirable where a caregiver wishes to enhance the animal's comfort while wearing the device for extended periods of time, such as during any healing period associated with ear infections or inner ear surgeries.

Thus, the device may be employed to naturally dry an animal's ear canals by exposing them to unobstructed airflow. This may prevent ear infections by eliminating humidity in the ear canals known to breed harmful bacteria and yeast following activities such as bathing, swimming, and grooming. In the event that an ear infection or other ear injury has been contracted, use of this device may even decrease healing times. The device may also be used by dog owners who wish to keep long-eared dogs ears clean during feeding, which is especially important in the dog show industry.

It is contemplated that the device may be employed not only for selectively increasing airflow around an animal's ear canals, but also in any scenario where it may be desirable to provide a caregiver with unobstructed access to the animal's ear canals. For example, securing the ears in an openly flipped position may aid caregivers in applying medications to the ears. As another example, exposing the ear canals in this manner may ease grooming, ear cleaning, and treatment procedures by freeing the caregiver's hands from needing to hold the ears back. Instead, the caregiver's hands may be free to enhance his or her dexterity. This may even allow the caregiver to easily soothe or even restrain the animal if necessary.

Of course, it will be recognized that the device may be used to expose ear canals of many kinds of animals. More particularly, it may be used to expose the ear canals of animals with floppy ears that fold over or cover the animals' ear canals. For example, some breeds of dogs are known to have floppy ears. These breeds may include Cocker Spaniels, Bassett Hounds, Airedales, and even Golden Retrievers. The device may even be used to expose the ear canals of animals such as rabbits, goats, sheep, and even horses. As such, it will be recognized that the device is not limited to use with particular breeds or even species of animals, and the foregoing are offered by way of example only.

Thus, it is an object of the invention to securely expose an animal's ear canals to unobstructed airflow in order to prevent bacteria and yeast buildup and further speed any healing process associated with certain ear conditions.

It is a further object of the invention to securely expose an animal's ear canals in order to aid cleaning of the ears and ear canals.

It is another object of the invention to securely expose an animal's ear canals in order to aid drying of the ear canals following grooming, bathing, and swimming activities.

It is still another object of the invention to securely expose an animal's ear canals in order to aid application of certain medicines and treatments in the ear canal.

It is yet a further object of the invention to provide a device for securely restraining an animals ears so that a caregiver may maintain use and dexterity of his or her hands while applying medication to the ears, cleaning the ears, or otherwise treating the ears.

One or more of the above-disclosed embodiments, in addition to certain alternatives, are provided in further detail below with reference to the attached figures. The disclosed subject matter is not, however, limited to any particular embodiment disclosed.

Figure 1:
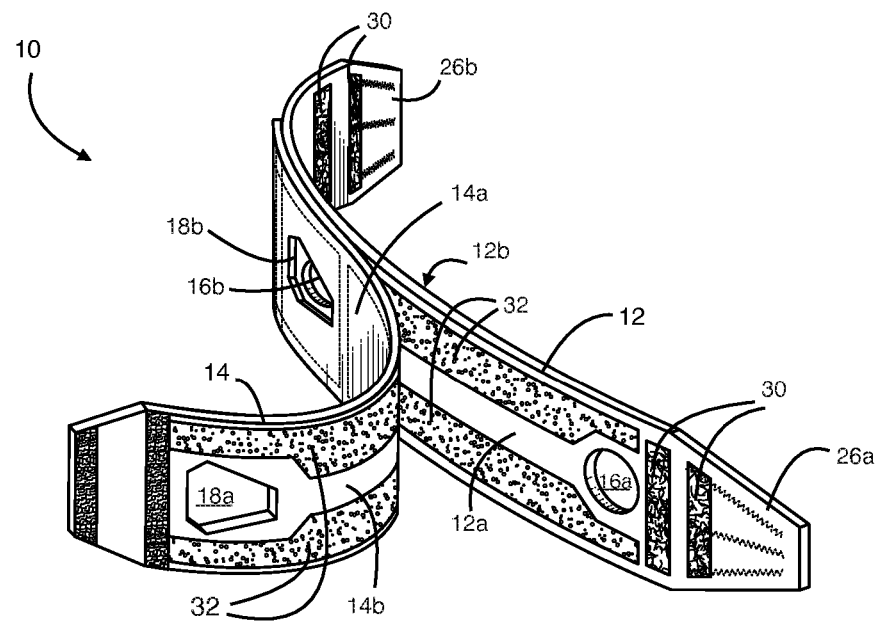
FIG. 1 is a perspective view of an embodiment of a device for securely exposing an animal's ear canals.

The disclosed embodiments may be better understood by referring to the figures in the attached drawings, as provided below. The attached figures are provided as non-limiting examples for providing an enabling description of the device claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

The terms "first," "second," "third," "fourth," and the like in the description and in the claims, if any, are used for distinguishing between similar elements and not necessarily for describing a particular placement, or sequential or chronological order. It is to be understood that the terms so used are interchangeable under appropriate circumstances such that the embodiments described herein are, for example, capable of physical arrangement other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

With reference to FIG. 1, the device 10 for securely exposing an animal's ear canals may comprise an elongate first strip 12 and an elongate second strip 14 having a top side 12a, 14a and a bottom side 12b, 14b. Furthermore, the first strip 12 may comprise a first hole 16a and a second hole 16b, and the second strip may similarly define a first hole 18a and a second hole 18b.

The first and second strips 12, 14 may comprise any material capable of conforming to the shape of an animal's head. Thus, in an embodiment, the material may be flexible. Moreover, the material may be rugged to withstand stress and strain from natural motions practiced by any animal wearing the device 10. In some embodiment, the material may even be elastomeric in order to enhance the animal's comfort while wearing the device 10 and accommodate the heads of animals of various shapes and sizes. Thus, it is contemplated that the first and second strips 12, 14 may comprise material such as neoprene, nylon, cotton, gauze, silk, linen, or even a combination of any of the same. Such material may even be disposable after a single use or washable for many uses over an extended period according to the needs of the animal and/or caregiver. Of course, it should be noted that such materials are offered by way of example only and not of limitation.

Referring now to FIGS. 2 through 8, an embodiment of the device 10 is shown in use to securely expose a dog's 20 ear canals. Of course, it will be recognized that the device may be used to expose ear canals of various animals. For example, the device 10 may be used to expose the ear canals of animals with floppy ears that fold over or otherwise cover the animals' ear canals. One skilled in the art will recognize, for example, that some breeds of dogs are known to have floppy ears that breed ear infections and other conditions potentially harmful to the animals' health. These breeds may include Cocker Spaniels, Bassett Hounds, Airedales, and even Golden Retrievers. Other breeds have particularly hairy ears that similarly breed infections that may be eradicated with increased exposure to airflow provided by the device 10. Such breeds may include Shih Tzus, Poodles, Chows, and Terriers. Of course, many other breeds susceptible to infection exist, and even dogs of breeds not known for experiencing chronic ear conditions may need their ears cleaned or treated from time to time. As such the foregoing breeds are mentioned simply to illustrate applicability of the invention, and not to limit it. Indeed, the device may even be used to expose the ear canals of animals such as rabbits, and goats, sheep, horses and any other animal whose ears a caregiver—such as a veterinarian, pet owner, rancher, or farmer—may have need to treat. Thus, it will be recognized that the device is not limited to use with particular breeds or even species of animals.

Figure 2:
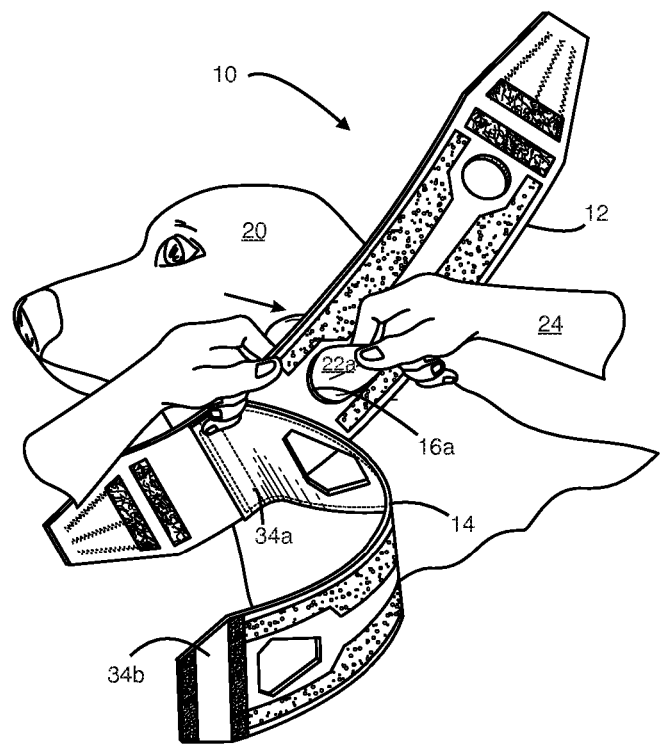
FIGS. 2 and 3 illustrate perspective, environmental views of an embodiment of the device from FIG. 1 receiving an animal's left ear.
Figure 3:
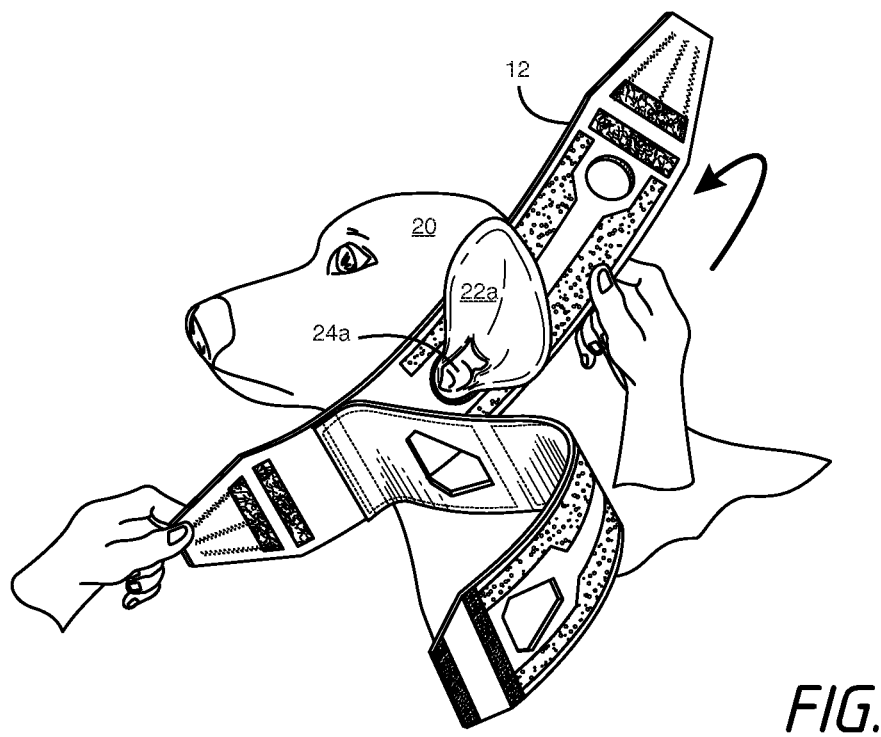

With attention turned to FIGS. 2 and 3, the first hole 16a defined by the first strip 12 may be sized to receive one of an animal's ears 22a. As illustrated, the animal's ear 22a, here belonging to a dog 20, may be pulled through the hole 16a by a caregiver represented by hands 24. It will also be noted that the ear 22a is a left ear, however, it is contemplated that the device may be symmetrical so that the first hole 16a may receive either of an animal's left ear or right ear there through without inhibiting the functionality of the device. Then, as illustrated in FIG. 3, the ear 22a may be received by the hole 16a defined by the first strip 12 and then positioned toward the top of the dog's 20 head. In this manner, the ear canal 24a may become exposed to the open air.

Figure 4:
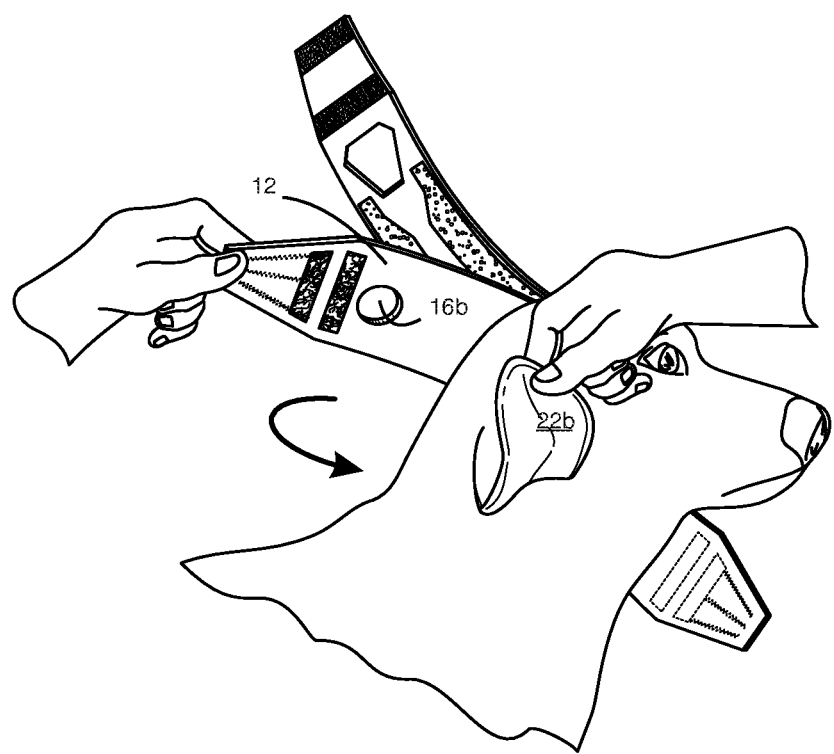
FIG. 4 illustrates a perspective, environmental view of an embodiment of the device from FIG. 1 receiving an animal's right ear.

Similarly, and with reference to FIG. 4, the second hole 16 defined by the first strip 12 may be sized to receive another of the animal's ears 22b. Then, with attention drawn to FIG. 5, the second hole 16b defined by the first strip 12 may be sized to receive a second one of the animal's ears 22b. It will be noted that the ear 22b is a right ear, however, as above, it is contemplated that the device may be symmetrical so that the second hole 16b may receive either of an animal's left ear or right ear there through without inhibiting the functionality of the device. toward the dog's 20 second ear. As above, the ear 22b may be received by the hole 16b defined by the first strip 12 and then positioned toward the top of the dog's 20 head. In this manner, the ear canal 24b may become exposed to the open air.

Figure 5:
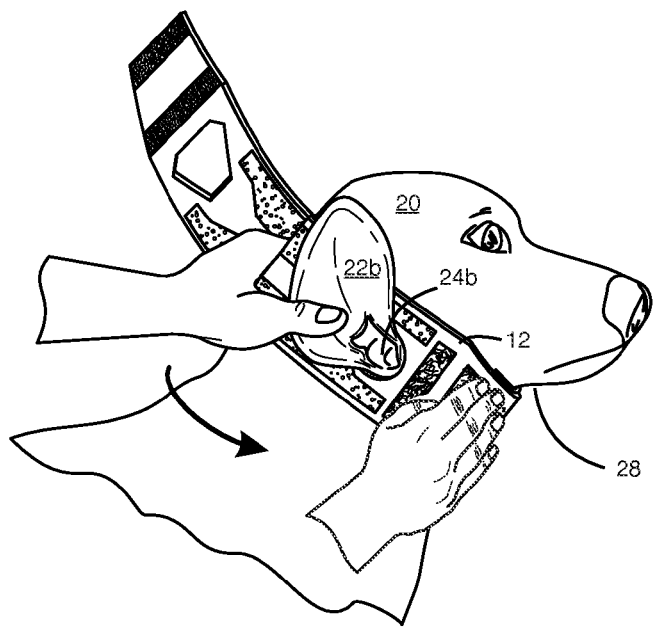
FIG. 5 illustrates a perspective, environmental view of an embodiment of the device from FIG. 1 being secured around an animal's head beneath its chin

With reference again to FIG. 1, in order to secure the device on the animal's head, the first strip 12 may further comprise first and second ends 26a, 26b that are releasably securable beneath the animal's chin 28, illustrated in FIG. 5. Referring to FIG. 1, the first and second ends 26a, 26b may comprise releasably meshable hook and loop fasteners 30. It is contemplated that providing releasably meshable hook and loop fasteners 30 in this manner may facilitate repeated adjustment of the device 10 on the animal's head. It is further contemplated that facilitating repeated adjustment of the device 10 in this manner may allow a caregiver to use the device 10 to treat or prevent ear conditions for several individual animals having differently shaped and sized heads at different times. In some embodiments, the first and second ends 26a, 26b may even further be tapered in to enhance comfort and avoid impeding the animal's cervical and mandibular ranges of motion. Of course, one skilled in the art will recognize that various other methods of releasably securing the first and second ends 26a, 26b may be used to practice the invention. Indeed, it is contemplated that the first and second ends 26a, 26b comprise elongate strings for tying the ends beneath the animal's chin 28 or even snaps to ensure the device remains securely placed on the animal's head while in use. As such, the hook and loop fasteners 30 illustrated are offered simply by way of example and not of limitation.

Figure 6:
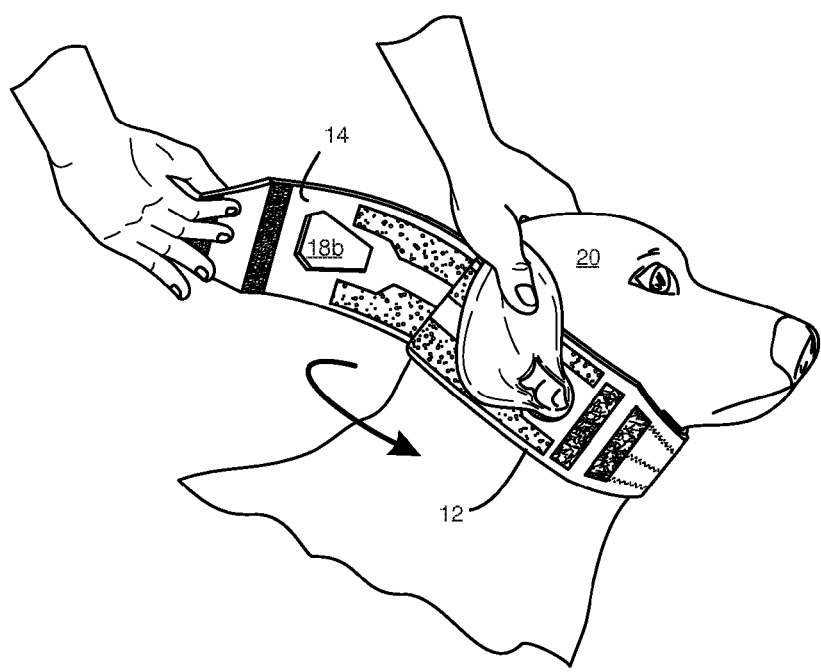
FIGS. 6 and 7 illustrate a perspective, environmental view of an embodiment of the device from FIG. 1 securing an animal's ears in place.
Figure 7:
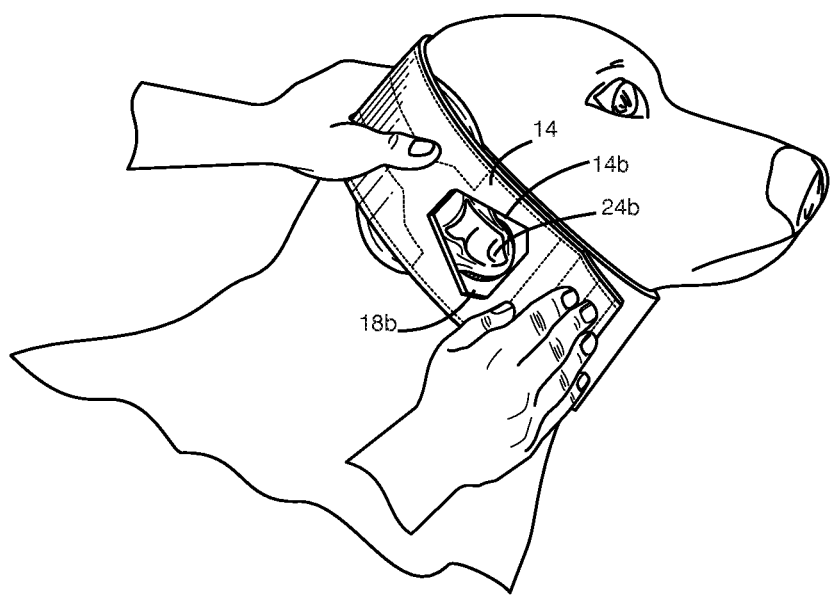
Figure 8:
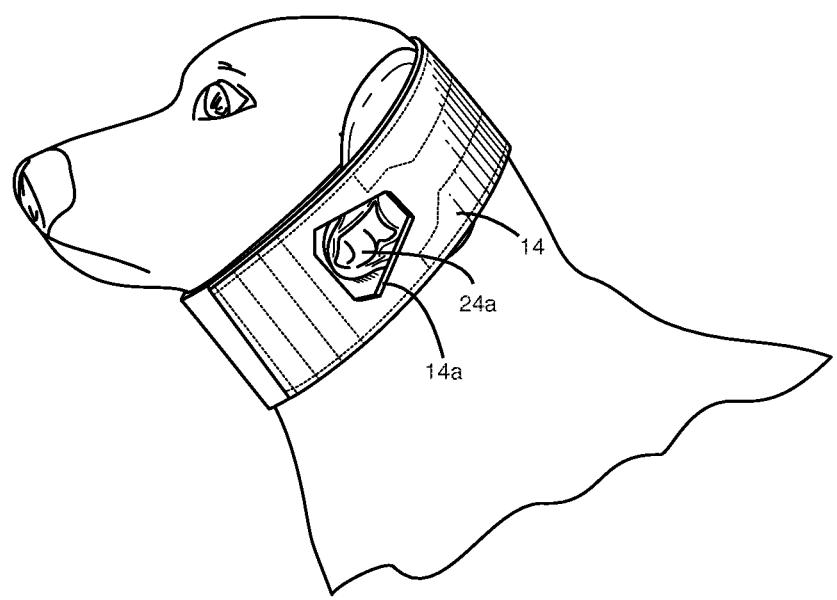
FIG. 8 shows an perspective, environmental view of an embodiment of the device from FIG. 1 securely exposing an animal's ear canals.

When the animal's ears have been received through the holes defined by the first strip 12, and the first strip has been secured around the animal's head 20, the second strip may then be placed over the openly folded ears as demonstrated in FIGS. 6, 7, and 8. In this manner, each of the first and second hole 18a, 18b defined by the second strip 14 may overlay one each of the ears' canals 24a, 24b, allowing the ear canals to remain exposed to the open air while the device is in use.

In one embodiment, the first and second strips may be releasably securable to one another so that the animal's ears may be selectively maintained in their openly folded position. For example, referring again to FIG. 1, the top side 12a of the first strip 12 and bottom side 14b of the second strip 14 may comprise hook and loop fasteners 32 to securably mesh the first and second strips 12, 14 with one another. As another example, the top side 12a of the first strip 12 and bottom side 14b of the second strip 14 may comprise snaps or zippers or other means for selectively securing the first and second strips 12, 14 to one another. In this manner, it is contemplated that an animal caregiver such as pet owner or even veterinarian may repeatedly secure and unsecure the first and second strips 12, 14 from one another. This may be particularly desirable where a caregiver wishes to enhance the animal's comfort while wearing the device for extended periods of time, such as during any healing period associated with ear infections or even ear surgeries.

In some embodiments, and with reference again to FIG. 2, the second strip 14 may further comprise first and second ends 34a, 34b wherein one of the first and second ends 34a is securely attached to the first strip 12. For example, one of the ends 34a may be stitched to the first layer 12 to enhance security of the first strip over the animal's ears. This may also avoid the risk of losing or damaging separate pieces of the device and as a decrease costs associated with replacing such lost or damaged pieces.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. For example, material chosen to comprise the device may be selected to accommodate the particular needs of the animal For example, disposable material such as cotton gauze may be chosen for application in short term or temporary use following surgery or in the event of unusual or unanticipated ear infections or treatment. As another example, rugged material such as neoprene may be chosen to efficiently accommodate an intended long-term use for animals prone to repeated or frequent ear infections. Accordingly, it is intended that the invention not be limited, except as by the appended claim(s).

The teachings disclosed herein may be applied to other systems and devices, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the device for securely exposing animal ear canals with which that terminology is associated. In general, the terms used in the following claims should not be constructed to limit the device for securely exposing animal ear canals to the specific embodiments disclosed in the specification unless the above description section explicitly define such terms. Accordingly, the actual scope encompasses not only the disclosed embodiments, but also all equivalent ways of practicing or implementing the disclosed device. The above description of embodiments of the device for securely exposing animal ear canals is not intended to be exhaustive or limited to the precise form disclosed above or to a particular field of usage.

While specific embodiments of, and examples for, the device are described above for illustrative purposes, various equivalent modifications are possible for which those skilled in the relevant art will recognize.

While certain aspects of the device disclosed are presented below in particular claim forms, various aspects of the device are contemplated in any number of claim forms. Thus, the inventor reserves the right to add additional claims after filing the application to pursue such additional claim forms for other aspects of the device for securely exposing animal ear canals.

What is claimed is:

1. A device for securely exposing an animal's ear canals, comprising:
   a first strip having a top side and a bottom side and opposing first and second ends, the first and second ends releasably securable to one another, the first strip further defining a first and second hole there through to respectively receive one each of the animal's ears; and
   a second strip having a top side and a bottom side and opposing first and second ends, the second strip further defining a first and second hole there through;
   wherein the bottom side of the second strip is releasably securable to the top side of the first strip so that the animal's ears may be securely interposed between the first and second strips; and
   wherein each of the first and second holes defined by the second strip are arranged to overlay and expose one each of the animal's ears, allowing the ear canals to remain exposed to the open air while the device is in use.

2. The device for securely exposing an animal's ear canals of claim 1, wherein one of the first and second ends of the second strip are permanently secured to the top of the first strip.

3. The device for securely exposing an animal's ear canals of claim 1, wherein the first and second end ends of the first strip comprise meshable hook and loop fasteners.

4. The device for securely exposing an animal's ear canals of claim 1, where in the top side of the first strip and bottom side of the second strip comprise meshable hook and loop fasteners.

5. A device for securely exposing an animal's ear canals, comprising:
   a first strip having a top side and a bottom side and opposing first and second ends, the first and second ends releasably securable to one another, the first strip further defining at least one hole there through to receive at least one of the animal's ears; and a second strip having a top side and a bottom side and opposing first and second ends, the second strip further defining at least one hole there through;

wherein the bottom side of the second strip is releasably securable to the top side of the first strip so that the at least one of the animal's ears may be securely interposed between the first and second strips; and wherein the at least one hole defined by the second strip is arranged to overlay and expose the at least one of the animal's ears, allowing any ear canal respective to the at least one of the animal's ears to remain exposed to the open air while the device is in use.

6. The device for securely exposing an animal's ear canals of claim 5, wherein one of the first and second ends of the second strip are permanently secured to the top of the first strip.

7. The device for securely exposing an animal's ear canals of claim 5, wherein the first and second end ends of the first strip comprise meshable hook and loop fasteners.

8. The device for securely exposing an animal's ear canals of claim 5, where in the top side of the first strip and bottom side of the second strip comprise meshable hook and loop fasteners.

* * * * *